Oct. 28, 1930.  C. T. SIEBS ET AL  1,779,563
PROCESS OF WELDING
Filed July 31, 1926
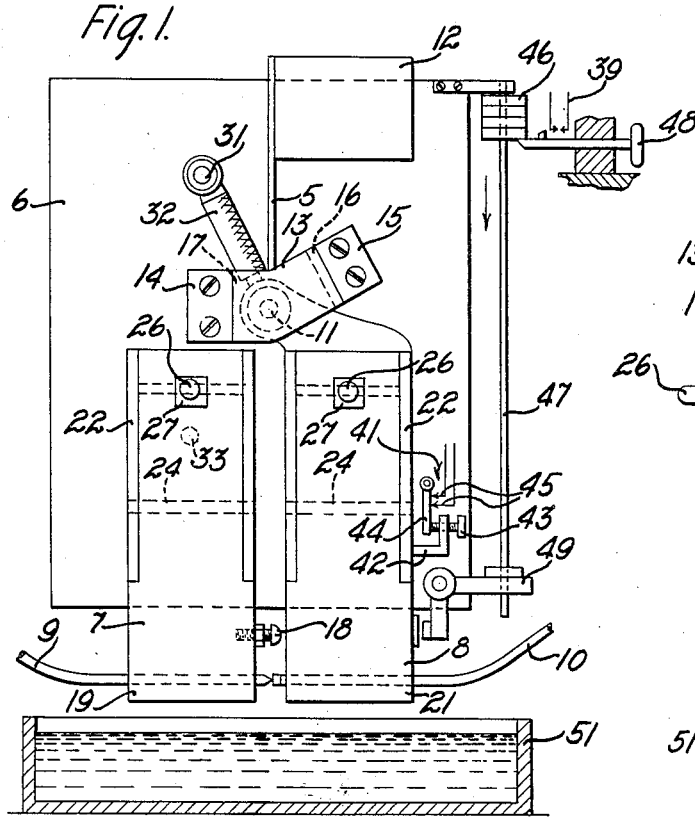
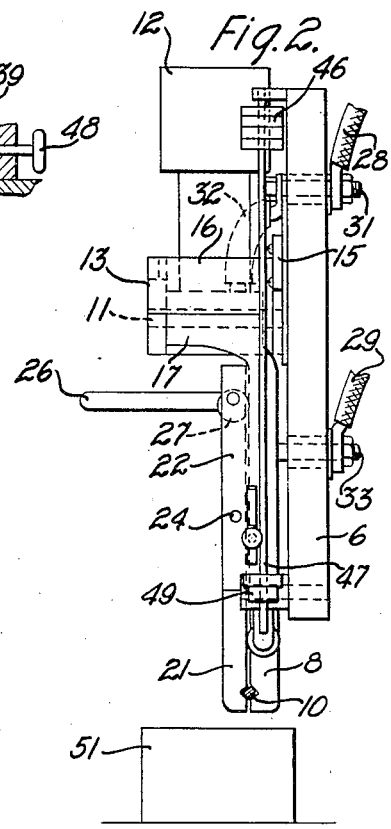
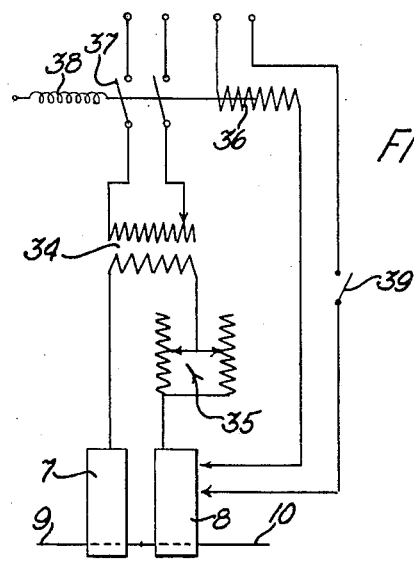
Inventors
Claude T. Siebs
Thomas A. Daniel
by H. A. Pattison Att'y.

Patented Oct. 28, 1930

1,779,563

UNITED STATES PATENT OFFICE

CLAUDE THEODORE SIEBS, OF RIVERSIDE, AND THOMAS ARCHIE DANIEL, OF MAY-WOOD, ILLINOIS, ASSIGNORS TO WESTERN ELECTRIC COMPANY, INCORPORATED, OF NEW YORK, N. Y., A CORPORATION OF NEW YORK

PROCESS OF WELDING

Application filed July 31, 1926. Serial No. 126,150.

This invention relates to a process of welding, and more particularly to a process of and apparatus for welding copper wires or rods.

In the process of welding materials such as copper wire, difficulty has been experienced in preventing the material from becoming overheated at and in the vicinity of the weld which results in a weakened physical structure of the metal due to a molecular change in the material, known in copper practice as "burnt copper" which may render the material brittle so that difficulty is experienced in drawing the wire to fine sizes due to breaking at the point where it was overheated.

An object of the present invention is to provide a process of producing a strong and ductile weld which obviates the difficulties heretofore experienced.

The invention contemplates the provision of a process and a convenient means for practicing the process in which a large amount of heat is initially supplied to the parts to be welded to effect a quick temperature rise and the temperature of the parts being welded is controlled and limited in such a manner as to complete the welding operation in the least possible time to avoid the deleterious effects which appear to accompany high temperatures of long duration, and the parts are protected against oxidation while heated. In accordance with one embodiment of the invention, the current is controlled by placing an element having a high positive temperature coefficient in the welding circuit which will allow a large initial flow of current while the element is cold to quickly bring the parts to the desired temperature, and as the temperature of the element increases due to the current, its resistance will increase and reduce the current to prevent excessive overheating. Any material which may have become molten during the heating is removed from the weld by a magnetic blow-out. When the parts have attained the proper temperature, the current is interrupted and after a definite delay to permit the copper to cool to a point slightly below the temperature at which it was welded, a sharp percussive blow is communicated to the parts upsetting the material at the weld and producing a forging effect to improve the molecular structure of the material. During the time the parts are heated, they are immersed in a non-oxidizing agent such as water or manganese dioxide to reduce the danger of excessive overheating and to prevent oxidation of the parts.

It is believed that a better understanding of the invention may be had by reference to the following description taken in conjunction with the accompanying drawings, in which Fig. 1 is a front elevation of a welding apparatus by means of which the method may be practiced;

Fig. 2 is a side elevation of the apparatus shown in Fig. 1, and

Fig. 3 is a diagrammatical illustration of the welding circuit and the control circuit therefor.

Referring to the drawings in which the same reference numerals refer to similar parts in the several views, and more particularly to Figs. 1 and 2, a back plate 6 supports two jaws 7 and 8 between which wires or rods 9 and 10 to be welded are clamped and held in abutting relation. In order to insure a uniform contact between the wires in every welding operation, the ends of the wires are cut to a wedge shape and the wedge-shaped edges are abutted at right angles as shown in Fig. 1. The jaw 7 is mounted in fixed relation to the base, while the jaw 8 is mounted on a pivot pin 11 for the purpose of allowing a relative movement between the jaws holding the wires 9 and 10 and enabling a weight 12, which is attached to the jaw 8 by a spring 5, to exert a pressure between their ends. In order to insure the rotation of the movable jaw in a definite plane, the pivot 11 is made long and is journaled at one end in the base 6 and at the other end in a U-shaped member comprising two flat portions 14 and 15 by means of which the member is fastened to the base, two upright portions 16 and 17 and a transverse portion 13 in which the other end of the pivot is journaled. The distance between the jaws is limited by an adjustable stop 18 which is insulated from the jaw. Each of the jaws 7 and 8 is provided with a movable clamping member 19 and 21, respectively, to hold the wires or rods to be welded, which members are pivoted in flanges 22—22 on the jaws by pins 24 passing through the flanges and the members and are operated by levers 26 which have at their base eccentrically pivoted cylinders 27. It is apparent that a downward movement of the lever 26 will cause the movable member of the jaw to pivot about the associated pin 24 and exert a pressure on the wire or rod held therebetween.

The apparatus comprises two circuits, a welding circuit and a control circuit therefor. The welding circuit, which includes a transformer 34 (Fig. 3), a control element 35, both of which are suitably mounted, and the welding jaws 7 and 8, is connected with the movable jaw 8 by a conductor 28 which is attached to a terminal 31, the opposite end of which is provided with a cable 32 leading directly to the movable jaw. The circuit is connected with the fixed jaw through a conductor 29 which is attached to a terminal 33, the opposite end of which connects directly with the fixed jaw. The control element 35 is located in one of the conductors between the secondary of the transformer and the welding jaws and consists of a plurality of nickel wires connected in parallel with each other. When this element is cold it will allow a large initial flow of current and as its temperature increases, due to the current, its resistance rapidly increases on account of the high positive temperature coefficient of the nickel wires, limiting the current to value and rate of decrease of which may be determined by the number and size of the nickel wires.

The control circuit (Fig. 3) is provided with a relay 36 suitably mounted which operates to close a switch 37 in the primary circuit of the transformer 34 against the action of a biasing spring 38 when the control circuit is closed, which closure may be accomplished by closing a hand operated switch 39. A second switch 41 (Fig. 1) is provided to open the control circuit and allow the biasing spring 38 to open the welding circuit when an arm 42 having an adjustable screw 43 moves a lever 44 out of engagement with terminals 45 of the control circuit after the jaw 8, to which the arm 42 is attached, has moved a predetermined distance toward the jaw 7.

The magnetic blow-out is constituted by the welding jaws and the material to be welded which form in effect a single turn of a coil. The inner sides of the jaws are made parallel in order to give the turn a sharp U-shaped bend in the vicinity of the weld. When a large current passes through this turn there is a tendency for the current carrying parts to be forced outwardly in a radial direction. This tendency may be illustrated by forming a wire into a rectangle and causing a large current to flow therethrough. The rectangle will tend to assume a circular shape due to the fact that the lines of magnetic force within the loop are much more concentrated than outside of the loop and the tendency for the lines to distribute themselves equally, forces the sides of the loop radially. The heavy current which it is possible to use in this device due to the current control element, is sufficient to magnetically blow any material, which becomes molten before the major portion of the material which constitutes the weld reaches the welding temperature, from the joint.

In order to bring the ends of the parts to be welded firmly together when they have attained the proper temperature, an adjustable weight 46 is slidably mounted on a rod 47 and is held in its upper position by a release pin 48, which when moved to a position to release the weight will simultaneously close the switch 39 in the control circuit. The lower end of the rod 47 passes through an opening in an arm of a bell crank lever 49 and guides the weight to strike the arm of the lever to communicate a percussive force through the movable jaw to the parts being welded. By reason of the flexibility of the spring 5 the jaw 8 may move forward without overcoming the inertia of the weight 12.

During the entire welding process the parts being welded are submerged in a non-oxidizing liquid, such as water or manganese dioxide, contained in a vessel 51 which is raised until the portion of the jaws clamping the material is immersed to prevent overheating and oxidation of the parts being welded, some of which, such as copper, have a strong affinity for oxygen at high temperatures.

The operation of the apparatus will be described as applied to the welding of copper wires in a non-oxidizing agent of water: The wires to be welded are prepared and are placed in the jaws 7 and 8 as described above, and firmly clamped therein by a downward pressure on the levers 26—26 and a continuous pressure is exerted on the abutting ends of the wires by the weight 12 acting through the spring 5 to continuously urge the jaw 8 toward the jaw 7. The stop 18 has been previously set for a given size of wire and similarly the switch 41 has been adjusted to open the control circuit after the jaw 8 has moved a predetermined distance toward the stop on the fixed jaw 7. The vessel 51 is now raised until the wires are immersed in the liquid contained therein and the apparatus is then in position to begin the welding process which is done by drawing out the release pin 48 to release the weight 46 and simultaneously close the switch 39 to cause energization of relay 36 to close switch 37 in the primary circuit of the transformer 34. As soon as the primary welding circuit is closed there will be a large rush of current in the secondary circuit due to the low resistance of the nickel wires 35 when cold, and the abutting tips, which will attain the highest temperature due to the high resistance of the small contact area, will fuse. The fused metal will be removed by the magnetic blow-out leaving a small gap between the wires for the reason that the inertia of the weight 12 prevents the jaw from moving as quickly as the tips are melted. The heat of the gap is quite intense and would burn the metal were it not for the fact that the current has been reduced by the control element whose resistance has been greatly increased by the effect of the heat due to the current, on the element which has a high positive temperature coefficient. When the jaw 8 has moved toward the jaw 7 a predetermined distance the arm 42 will open the switch 41 and break the control circuit, deenergizing the relay 36, and allowing the biasing spring 38 to open the switch 37 in the primary circuit of the transformer 34. The copper is at this time just at the fusing temperature at which point it is very brittle and it is therefore allowed to cool until it reaches a slightly lower temperature at which time the weight 46 will have completed its travel down the rod, and will strike the bell crank lever 49 and communicate a percussive blow to the parts through the jaw 8, upsetting the material and producing the effect of forging the material to improve its molecular structure and completing the welding operation.

During the entire welding process the parts being welded are immersed in water to prevent overheating and oxidation. Although while the copper is being heated there may be a slight formation of copper oxide formed by the heated copper and the free oxygen in the water, on account of the eutectic nature of copper oxide it will be in the molten state and be blown out by the magnetic blow-out with the molten copper.

A weld made in accordance with this invention and the material adjacent thereto is identical in molecular structure with the original material and may be drawn to the same sizes as the original material without exhibiting any weakness at or near the joint.

It will be understood that the embodiment of the invention herein described and illustrated is merely a convenient and useful form of the invention, which is capable of many other modifications without departing from the spirit and scope of the invention.

What is claimed is:

1. A process of welding, which consists of abutting the parts to be welded, causing a current to flow through the parts to produce a gap between the parts, reducing the current across the gap, and after the parts have been brought to the fusing temperature, interrupting the current to allow them to cool to a lower temperature, and imparting a percussive force to the parts to bring them together.

2. A process of welding, which consists of abutting the surfaces of the parts to be welded, causing a current to flow through the abutting surfaces to raise them to a welding temperature, and magnetically blowing out material which becomes molten before the major portion of the material to be welded attains the welding temperature.

3. A process of welding, which consists of heating the parts to be welded to the desired temperature, magnetically blowing out material which becomes molten during the heating operation, and when the parts have attained the correct temperature imparting a percussive force to the parts to bring them firmly together.

4. A process of welding, which consists of abutting the surfaces of the parts to be welded, causing a current to flow through the abutting surfaces, rapidly reducing the current as the parts approach the fusing temperature and when the fusing temperature is attained, allowing the parts to cool, and then imparting a percussive force to the parts to bring them into firm contact.

5. A process of welding, which consists of abutting the surfaces of the parts to be welded, immersing them in a nonoxidizing medium, causing a current to flow through the abutting surfaces, rapidly reducing the current as the parts approach the fusing temperature and when the fusing temperature is attained allowing the parts to cool, and then imparting a percussive force to the parts to bring them into firm contact.

6. A process of welding, which consists of abutting the surfaces of the parts to be welded, immersing them in a non-oxidizing medium, causing a large current to flow through the abutting surfaces, rapidly reducing the current as the parts approach the fusing temperature, magnetically blowing out the material which becomes molten before the major portion of the parts attains the fusing temperature and when the fusing temperature is attained allowing the parts to cool, and then imparting a percussive force to the surfaces to bring them into contact.

7. A process of welding, which consists of supplying a large amount of heat to the parts to be welded to effect a quick temperature rise, predeterminedly controlling the amount of heat supplied to attain a desired temperature, removing portions of the parts to be welded, interrupting the supply of heat, and firmly bringing the parts to be welded into contact.

8. A method of welding, which consists of abutting the surfaces of the parts to be welded, raising the temperature of the abutting surfaces above the welding temperature, removing the parts which become molten, allowing the remaining parts to cool momentarily, and percussively engaging the parts.

9. A method of welding, which consists of raising the temperature of the parts to be welded above the welding temperature, allowing the parts to cool to the welding temperature, and percussively engaging the parts.

10. A method of welding, which consists of abutting the surfaces of the parts to be welded, supplying a large amount of heat to the parts to momentarily raise them above the welding temperature, sharply reducing the amount of heat supplied, and finally interrupting the supply of heat.

11. A method of welding, which consists of abutting the surfaces of the parts to be welded, supplying a large amount of heat to the parts to momentarily raise them above the welding temperature, magnetically removing parts which become molten, sharply reducing the amount of heat applied, and finally interrupting the supply of heat.

12. A method of welding, which consists of contacting the parts with each other in a welding position, heating the material to be welded to a high temperature at their points of contact, magnetically blowing out material which becomes molten before the major portion of the material attains the welding temperature, and pressing the materials together.

13. A method of welding, which consists of raising the temperature of the parts to be welded above the welding temperature, magnetically blowing out material which becomes molten before the major portion of the parts attains the welding temperature, allowing the parts to cool to the welding temperature, and percussively engaging the parts.

14. A method of welding, which consists of abutting the surfaces of the parts to be welded, supplying a large amount of heat to the parts to raise them above the welding temperature, sharply reducing the amount of heat supplied, and percussively engaging the parts.

In witness whereof, I hereunto subscribe my name this 17th day of July, A. D. 1926.

CLAUDE THEODORE SIEBS.
THOMAS ARCHIE DANIEL.